United States Patent
Liebig et al.

(10) Patent No.: US 6,786,034 B2
(45) Date of Patent: Sep. 7, 2004

(54) FLOW MACHINE AND PROCESS OF OPERATION

(75) Inventors: Erhard Liebig, Laufenburg (DE); Roland Ulrich, Tiengen (DE); Michael Vollmer, Birmenstorf (CH)

(73) Assignee: Alstom Technology LTD, Baden (CH)

(*) Notice: Subject to any disclaimer, the term of this patent is extended or adjusted under 35 U.S.C. 154(b) by 0 days.

(21) Appl. No.: 10/002,149

(22) Filed: Dec. 5, 2001

(65) Prior Publication Data

US 2002/0092304 A1 Jul. 18, 2002

(30) Foreign Application Priority Data

Dec. 22, 2000 (DE) .......................................... 100 64 263

(51) Int. Cl.[7] .............................................. F02C 7/00
(52) U.S. Cl. ........................... 60/39.41; 60/39.5; 60/726
(58) Field of Search ........................... 60/39.182, 39.41, 60/39.5, 772, 726

(56) References Cited

U.S. PATENT DOCUMENTS

| 3,968,647 | A | * | 7/1976 | Boudigues ................. 60/39.41 |
| 3,979,903 | A | | 9/1976 | Hull, Jr. et al. |
| 4,271,665 | A | * | 6/1981 | Mandrin ................... 60/39.182 |
| 5,473,884 | A | * | 12/1995 | Sutton et al. ............ 60/39.182 |

FOREIGN PATENT DOCUMENTS

GB 1557817 12/1979

* cited by examiner

Primary Examiner—Louis J. Casaregola
(74) Attorney, Agent, or Firm—Burns, Doane, Swecker & Mathis, L.L.P.

(57) ABSTRACT

A flow machine is shown with a compressor and at least one turbine, and in which an air intake booster is arranged in an intake duct of the compressor, and an exhaust gas booster is arranged in an exhaust gas duct of the at least one turbine. In operation of the flow machine, the individual booster stages are operated, singly or in combination, in dependence on the specific operating conditions. The flow machine and the associated operating process make possible an economical mode of operation of the flow machine.

3 Claims, 2 Drawing Sheets

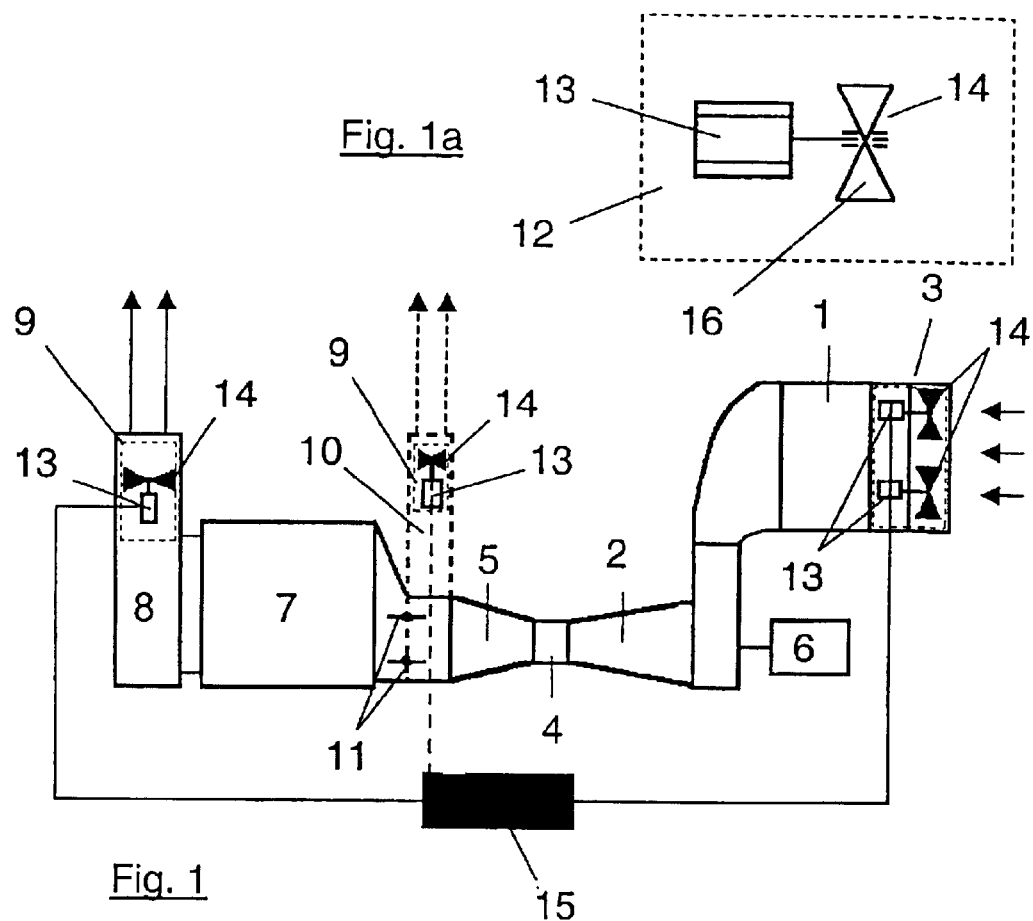
Fig. 1a
Fig. 1
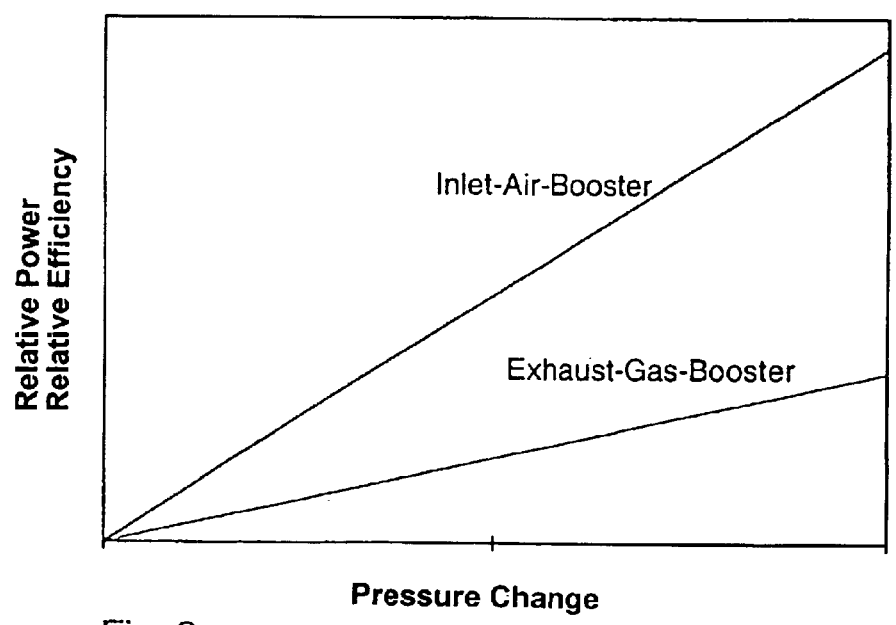
Fig. 2

FLOW MACHINE AND PROCESS OF OPERATION

FIELD OF THE INVENTION

The present invention relates to a flow machine with a compressor and at least one turbine, with a booster stage with one or more booster elements arranged in the intake duct of the compressor, and also to a process for the optimized operation of such a flow machine.

The present flow machine is suitable for the embodiment of a gas turbine, gas turbine plant, or combination plant, principally for energy production under the condition of the use of different fuels, under changing ambient conditions, and also special supply network requirements.

BACKGROUND OF THE INVENTION

A gas turbine is known from U.S. Pat. No. 3,979,903 in which a booster fan is arranged in the intake duct of the compressor. This booster fan is driven by a separate turbine at about constant power and makes possible, among other things, an increased power of the gas turbine plant.

It is also known to insert one or more such booster fans in the intake duct of the compressor of gas turbine plants. These so-called air intake boosters increase the mass flow of air, leading to a power increase of the gas turbine plant They are therefore used at peak load times or when it is necessary to provide additional reserve power, etc. Furthermore, effects on the power of the gas turbine plant due to seasonal, locational and climatic influences can be compensated for by the operation of this booster fan.

A further possibility for power increase of a gas turbine plant consists in the arrangement of one or more booster fans in the exhaust gas duct of the turbine. These so-called exhaust gas boosters lead to a reduction of the pressure in the exhaust gas duct and thus to an increase in the expansion drop of the hot gases emerging from the turbine. The increase of the expansion drop furthermore results in a power increase of the gas turbine plant. The booster fans in the exhaust gas duct can, like the air intake boosters, be switched on in peak load times and also when it is necessary to provide additional reserve power. They can likewise be used for the compensation of seasonal, locational and climatic influences on the power of the gas turbine plant.

SUMMARY OF THE INVENTION

The present invention provides a flow machine and also an operating method for the flow machine, which make possible a smooth manner of operation of the plant, which is improved over the state of the art, and also is optimized as regards climatic, locational and design influences, changing fuels, and different supply network requirements.

The present flow machine, which is equipped in known manner with a compressor for the compression of the combustion air intake, and also at least one turbine, has a first booster stage which is arranged in the intake duct of the compressor. The flow machine furthermore has a second booster stage arranged in an exhaust gas duct which adjoins the at least one turbine directly or via intermediate elements.

The first booster stage and/or the second booster stage can also be arranged in already existing, or additionally installed, bypass ducts to the respective intake duct or exhaust gas duct.

The use of such booster stages in conventional systems was only either in the intake duct or in the exhaust gas duct in order to adjust the pressure conditions there, corresponding to the specific requirements of the respective flow machine. The inventors of the present flow machine have discovered, however, that by means of the combined use of both booster stages in a flow machine, an optimized mode of operation of this flow machine is made possible over a very wide range of operation.

The first booster stage and the second booster stage serve to optimize the whole intake region as far as the inlet of the intake air into the compressor, and the whole exhaust gas region up to the exit of the exhaust gases from the turbine, both from a structural perspective and also with regards to flow technology.

The first booster stage and/or the second booster stage can be respectively constructed as a single (large) booster element or plural (small) booster elements. The individual booster elements of a respective booster stage can be arranged in a series or parallel arrangement with respect to the intake air or the exhaust gas. The arrangement of the booster elements is furthermore independent of items built into the intake duct (e.g., air filter) and exhaust gas duct (e.g., noise control elements). The booster elements of a booster stage can be arranged before, after, or both before and after an installed item.

The fans of the booster elements are preferably driven by speed-controlled drives. The power requirements of the first and second booster stages can be minimized by means of a suitable control. In order to be able to operate the booster elements for special purposes even when the supply network power fails, a design of the drives of the booster elements as low voltage drives is advantageous.

For an economical operation of the first and second booster stages, it is furthermore appropriate to equip the fans of the booster elements with adjustable fan blades.

Since the exhaust gases of the turbine have a very high temperature, it is furthermore appropriate to use the exhaust gas heat in a heat recovery system before discharge of the exhaust gases into the atmosphere. Waste heat boilers for producing hot water or steam particularly are useful for this purpose.

With this mode of construction, a flow machine is implemented which has both so-called air intake boosters and also so-called exhaust gas boosters. Just the possibility of use of the two booster stages either singly, i.e. in a different sequence, or in combination, i.e., simultaneously with possibly different power, makes it possible to optimally adjust the mode of operation of the flow machine respectively to varying operating conditions. Varying operating conditions arise, for example, in dependence on the ambient conditions, the load conditions of the whole plant, the fuel used, and also on the supply network requirements.

Since both the air intake booster and also the exhaust gas booster contribute to the increase of power and also to an increase of efficiency, both booster stages are to be in operation during normal operation. This is particularly so when, due to a high current or power requirement in the supply network, high current remunerations can be attained. The same is true when reserve power is required or is to be offered at short notice. This holds also, however, for power equalization with the use of a qualitatively worse fuel.

If the flow machine is put to use for the purpose of frequency regulation, i.e., for regulation of the national supply network frequency, this means an oscillating mode of operation with a very high dynamic load, particularly on the thermally loaded components of the hot gas path. This power delivery, oscillating in a small power range, is now undertaken by the first and/or second booster stage(s).

In times when the power supply load is abating, i.e., in times of decreasing current remunerations, the less efficient exhaust gas booster can first be taken out of operation, followed by the air intake booster. In a further step, the forward guide blade row on the compressor can be closed, and after these potentials have been exhausted, the entry temperature into the turbine can still be lowered.

An individual operation of a respective booster stage thus preferably presents itself in the region of partial load operation, or to fulfill special requirements. The buoyancy conditions of the exhaust gas flowing out of the exhaust gas duct are also improved by the use of the exhaust gas booster. An exhaust gas booster can ensure buoyancy conditions analogous to a reduction of the height of the exhaust gas duct, in comparison with a clearly; higher exhaust gas duct. The operation of the exhaust gas booster can however also contribute to the improvement of the emission conditions in unfavorable or extreme weather conditions.

Before or during the startup of a flow machine, it is important to ensure that no combustible substances remain in the system by a flushing process of the whole system. This flushing process is usually implemented by rotating the shaft line. Flow conditions in which combustible substances are blown out of the system are to be attained by means of the compressor. Furthermore, for starting a flow machine, the shaft line has to be accelerated up to a predetermined rpm before the beginning of firing. A further acceleration is required in order to attain self-supporting operating conditions. The acceleration and the rotation of the shaft line to or at a relatively high rpm is at present usually implemented by means of a starting converter and an operation of the generator as a motor.

An efficient flushing of the gas turbine plant and of the exhaust gas system can now be attained by the operation of the first and/or second booster stage(s), particularly in connection with the use of waste heat boilers for steam production downstream of the at least one turbine during the starting of the gas turbine plant.

For example, for shortening the inspection times of flow machines, it can be appropriate to possibly additionally cool these, already during, but particularly after, stopping. This additional cooling, termed "forced cooling", is furthermore usually implemented in that the shaft is turned by means of the startup converter and the generator, and cold air is flowed through the flow machine by means of the compressor. The same task can now be implemented by means of the first and/or second booster stage.

The operation of the booster stages can also contribute during power increases or during normal operation to having the flow machine run more smoothly, or to implement greater power gradients. Thus it is possible, with incorporation of the first and second booster stage during startup or when there are power increases, to implement a greater power gradient, or to run the plant more smoothly at the same power gradient and reduce firing power. Even in stationary operation it is possible, in dependence on the specific conditions, to reduce the firing power of the flow machine when implementing a comparable plant power, so as to reduce the upper process temperatures in order thus to reduce, in particular, the thermal loading of the components.

The design possibilities and modes of operation which have been described by way of example show that by means of the total of the measures and their combination, a further range of possibilities for the design and the optimization of the operation of a gas turbine or combination plant is available under the operating conditions present at any given time.

The equipment of gas turbines or combination plants with air intake boosters and exhaust gas boosters is of course not limited to new plants. These boosters can also be retrofitted to existing plants for the compensation of, for example, aging effects. They can also be used, however, for raising power and efficiency, for adjustment of the power to the requirement structure, and the like.

BRIEF DESCRIPTION OF THE FIGURES

FIGS. 1 and 1a illustrate a gas turbine plant according to an embodiment of the invention.

FIG. 2 is a graph illustrating the effects of a first booster stage 3 and second booster stage 9 on the efficiency and power.

DETAILED DESCRIPTION OF THE PREFERRED EMBODIMENTS

Figure 3:
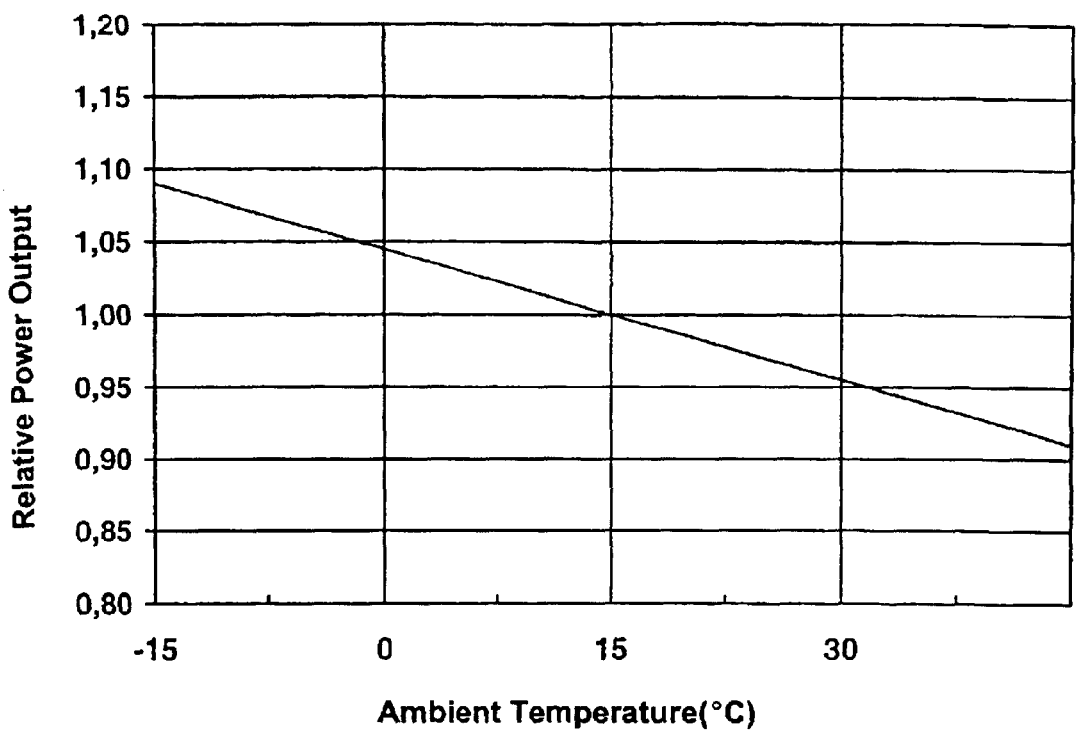
FIG. 3 is a graph illustrating the influence of the ambient temperature on the relative output power of the gas turbine plant under full load conditions.

The present flow machine is preferably embodied as a gas turbine plant or as a combination plant for energy production. FIG. 1 shows in this connection the basic construction of the flow machine in the example as a gas turbine plant, without going into the details, which are sufficiently known to a person skilled in the art, such as the exact construction of the compressor, the turbine, the combustion chamber, or the other elements of such a plant. Furthermore, in this example, the exact construction of the air intake booster or of the exhaust gas booster is not dealt with, since their multiplicity of form and design can likewise be gathered from the technical literature by analogy with fans.

By "flow machine" hereinafter there is to be understood a plant including a compressor and at least one turbine.

By "gas turbine", as a specific form of a flow machine, there is to be understood a plant including a compressor, at least one combustor, and at least one turbine. Furthermore a gas turbine plant includes a generator for current generation.

By "combination plant" there is to be understood firstly the coupling of a gas process and a steam process in the form of a gas turbine plant and a steam turbine plant. The heat of the exhaust gases of the turbine of the gas turbine plant then serves for steam production in a waste heat boiler. The steam produced is used for current generation by means of the steam turbine plant.

In the gas turbine plant shown in FIG. 1, a first booster stage (air intake booster) 3 is arranged in the intake duct 1 of the compressor 2. This first booster stage 3 in the intake duct 1 can be arranged before or after the gas turbine air filter system, in the flow direction, in the intake duct 1. The first booster stage 3 on the one hand reduces the pressure losses over the whole intake duct 1 of the gas turbine plant, or respectively increases the intake pressure for the compressor 2 and thus increases the inflow air mass flow. On the other hand, the first booster stage 3 can also serve to optimize the whole intake duct 1 with regard to flow technology (e.g., smaller cross sections) and the structural features (e.g., more efficient air filter). An increase of the pressure losses, which may be caused by a mode of construction which saves costs and space, a layout of the intake duct subordinated to the arrangement planning, more efficient air filter, and the like, can be compensated for by means of the booster stage 3.

The combustion air sucked in by the compressor 2, after the fuel is admixed, is combusted as a fuel-air mixture in a combustor 4, and drives the turbine 5 as compressed hot gas, while expanding. The useful power furnished by the gas turbine plant, which consists in the present case of the compressor 2, combustor 4, and turbine 5, furthermore serves to drive the generator 6. In the example shown, the turbine 5 is followed by a waste heat boiler 7 in which heat is withdrawn from the hot exhaust gases and is used for the production of steam for a steam turbine plant, not shown here.

The second fundamental component of the system according to the invention, the second booster stage (exhaust gas booster) 9, is arranged in the following exhaust gas duct 8, and in the present example is a large booster element 12 filling the cross section of the exhaust gas duct 8.

A bypass (chimney) 10 can be arranged between the turbine 5 and waste heat boiler 7, for an operation of the flow machine independently of the operation of the waste heat boiler 7. By means of a flap system 11, the hot exhaust gases of the turbine 5 can be selectively conducted into the surroundings, directly by means of the exhaust-side bypass (bypass chimney) 10, or via the waste heat boiler 7 and the exhaust gas duct 8. An exhaust gas booster 9 can also be arranged in the exhaust-side bypass 10. The same facts of course hold for the case of a bypass 10 on the intake duct 1 side.

The pressure loss over the exhaust gas system including the waste heat boiler 7 is reduced, or the expansion final pressure of the turbine 5 is lowered by means of the second booster stage 9 on the outlet side of the waste heat boiler 7. The power of the gas turbine plant is in turn increased. Furthermore, by means of this second booster stage 9, for example by an increase of the speed of the exhaust gases at the exit from the exhaust gas duct 8, an increase of the upward drive of the exhaust gas is attained. The emission conditions can thereby be improved in times of unfavorable or extreme weather conditions. On the other hand, the second booster stage 9 thereby offers the possibility, with the same emission conditions, of reducing the height of the exhaust gas duct 8, should this be necessary, for example for architectural reasons.

Analogously to the air intake booster 3, the exhaust gas booster 9 can also serve to optimize both structural characteristics and flow technology for the whole exhaust gas system, i.e., of the waste heat boiler and exhaust gas duct.

By specific control of the booster stages, account can furthermore be taken of, for example, locational and climatic influences, different fuel qualities, differentiated supply network requirements, and the like.

In FIG. 2, the effects of a first booster stage 3 and second booster stage 9 on the efficiency and power are shown qualitatively. At the same pressure change (intake pressure increase with inlet air booster or exhaust gas pressure reduction with exhaust gas booster), the first booster stage 3 has a clearly greater effect. For this reason, the first booster stage 3 is clearly to be given precedence, particularly in dependence on the power level to be run. The qualitative difference between the first and second booster stages 3, 9 results from the different volume flows at the air inlet and at the exhaust gas outlet due to density differences.

A respective booster stage 3, 9, i.e., the first booster stage 3 also designated as the air intake booster 3 and the second booster stage 9 also designated as the exhaust gas booster 9, can include one or more booster elements 12, arranged in parallel or in series, connected to the intake air or exhaust gas flow. Each booster element 12 has a drive 13 and a fan 14.

The fans 14 of the booster elements 12 are preferably driven by speed-controlled drives 13, as is schematically shown in FIG. 1. The operation of the gas turbine plant can be optimally adjusted to changing operating conditions at each time by means of this speed-controlled drive 13, in order thus to make it possible to run the plant as economically as possible.

The present system preferably contains a corresponding control 15 for the speed-controlled drives 13 of the booster elements 12 of both booster stages 3, 9.

To adjust the operation of the booster stages 3, 9 to the operating conditions of the gas turbine plant, it is furthermore advantageous to equip the fans 14 of the booster elements 12 with adjustable fan blades 16 (see FIG. 1a).

Furthermore, by the operation of the booster stages 3, 9 before or during a startup of the gas turbine plant, the flushing of the gas turbine plant, or the waste heat boiler 7, and of the exhaust gas duct 8, is effected, or this process is supported.

The booster stages 3, 9 can also be made use of during stopping or shutting down of the plant. For a rapid cooling of the gas turbine plant after stopping, the booster stages 3 and/or 9 are operated in the sense of "forced cooling". A "forced cooling" is thus possible without the use of the starting converter and generator.

The drives (13) of the booster elements (12) are preferably of low voltage design and consequently are supplied from the low voltage level. In contrast to the starting converter, which is supplied from the middle voltage level, the low voltage supply of the booster drives also offers the possibility of an operation under the conditions of power failure. Also under "black grid" situations, flushing to meet security technical requirements, or a "forced cooling", are thus possible.

The two booster stages 3 or 9 can be operated either alone or in combination. Both booster stages 3, 9 primarily serve to increase power and to improve the efficiency of the whole plant. On starting or stopping the plant, or else when load changes occur, greater power gradients can be implemented by means of the booster stages 3, 9. However, both booster stages 3, 9 can also effect an increase of the life of the plant by making smoother operation possible, in that—at the same power gradient or the same output power as without operation of the booster stages—a temperature reduction in the gas turbine plant is made possible, corresponding to the additional power obtained by means of the booster stages. Such a mode of operation of a gas turbine plant which reduces the EOH (Equivalent Operating Hours) can be of advantage, for example, in the night hours or at weekends, i.e., at times with very low fuel [sic] prices.

Gas turbine plants can be used for frequency control duties. However, this brings with it considerable dynamic loads, particularly for the components of the hot gas path. The power changes demanded by frequency regulation can now result from a corresponding regulation of the first and/or second booster stages 3, 9.

Figure 4:
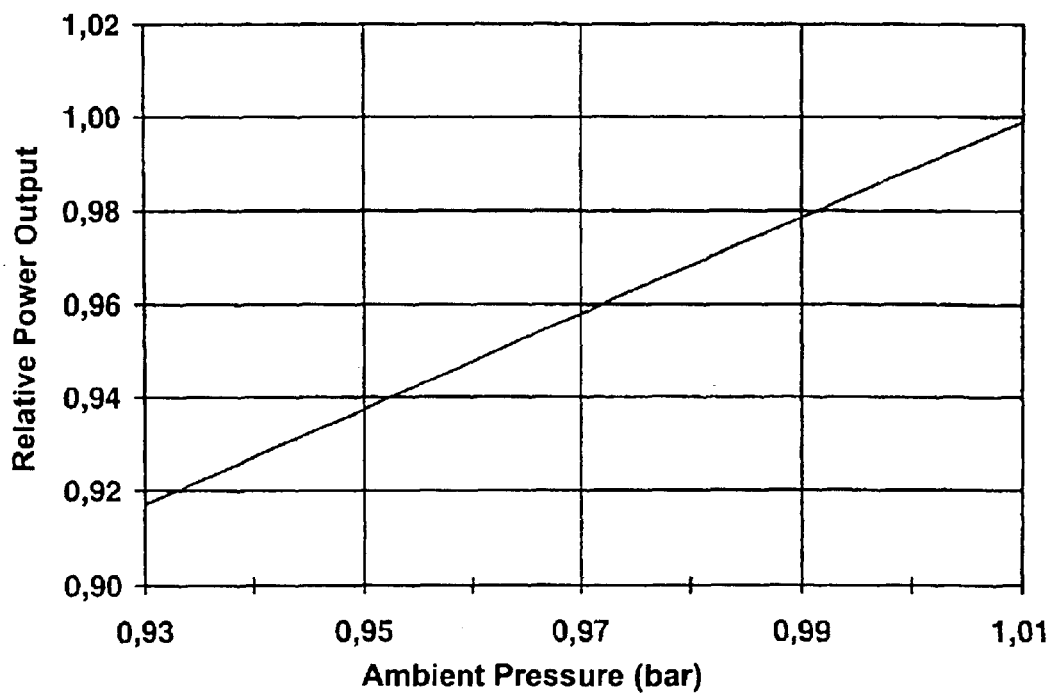
FIG. 4 is a graph illustrating the dependence of the relative output power of the gas turbine plant under full load conditions on changes of the pressure of the ambient air.

The possibility of the compensation of different or varying ambient conditions with the two booster stages 3, 9 is evident from FIGS. 3 and 4. Here FIG. 3 shows the influence of the ambient temperature on the relative output power of the gas turbine plant under full load conditions. In this diagram, the decrease of the relative output power of the gas turbine plant when the ambient temperature rises is evident. Such a reduction of power can be counteracted by switching on the booster stages when the ambient air temperature rises.

Finally, FIG. 4 shows the dependence of the relative output power of the gas turbine plant under full load conditions on changes of the pressure of the ambient air due to weather conditions or due to the height of the installation. It is evident from this diagram that the relative output power of the gas turbine plant likewise falls when the air pressure decreases. This power change in dependence on ambient air pressure can also be counteracted by switching on the booster stages.

What is claimed is:

1. A flow machine comprising a compressor, said compressor having an intake duct, at least one turbine, an exhaust duct connected to the at least one turbine directly or through intermediate elements, a first booster stage arranged in the intake duct or in an additional duct of the compressor; a second booster stage arranged in the exhaust gas duct, or in an additional duct of the exhaust duct; at least one of the first booster stage and the second booster stage comprises one or more booster elements with fans, the booster elements with fans being arranged in parallel or series, and wherein the booster elements have electrical drives which are designed as low voltage drives.

2. The flow machine according to claim 1, wherein the fans of the booster elements are driven by a speed-controlled drive.

3. The flow machine according to claim 1, wherein the fans of the booster elements are equipped with adjustable fan blades.

* * * * *